United States Patent

Baum

[15] 3,688,184
[45] Aug. 29, 1972

[54] AUTOMATIC COLOR CRT TRACKING TESTER AND METHOD OF TESTING

[72] Inventor: Robert E. Baum, Dell Rapids, S. Dak.

[73] Assignee: Sencore, Inc., Sioux Falls, S. Dak.

[22] Filed: June 1, 1971

[21] Appl. No.: 148,628

[52] U.S. Cl. ..........324/20 CR, 307/279, 178/5.4 TE
[51] Int. Cl. ..........................G01r 31/22, H04n 9/20
[58] Field of Search ............324/20 CR; 178/5.4 TE; 307/279

[56] References Cited

UNITED STATES PATENTS 3,270,125  8/1966  Kelly.....................178/5.4 TE
3,309,459  3/1967  Donigian...............324/20 CR

*Primary Examiner*—Rudolph V. Rolinec
*Assistant Examiner*—David M. Carter
*Attorney*—Fidler, Patnaude & Lazo

[57] ABSTRACT

Tracking of the three guns of a color cathode ray tube is tested to determine if the tracking is within allowable limits by a circuit which stores voltages proportional to the emission currents of the guns under standard operating conditions and compares such voltages to provide an indication if such voltages differ from one another by more than a predetermined amount.

9 Claims, 1 Drawing Figure

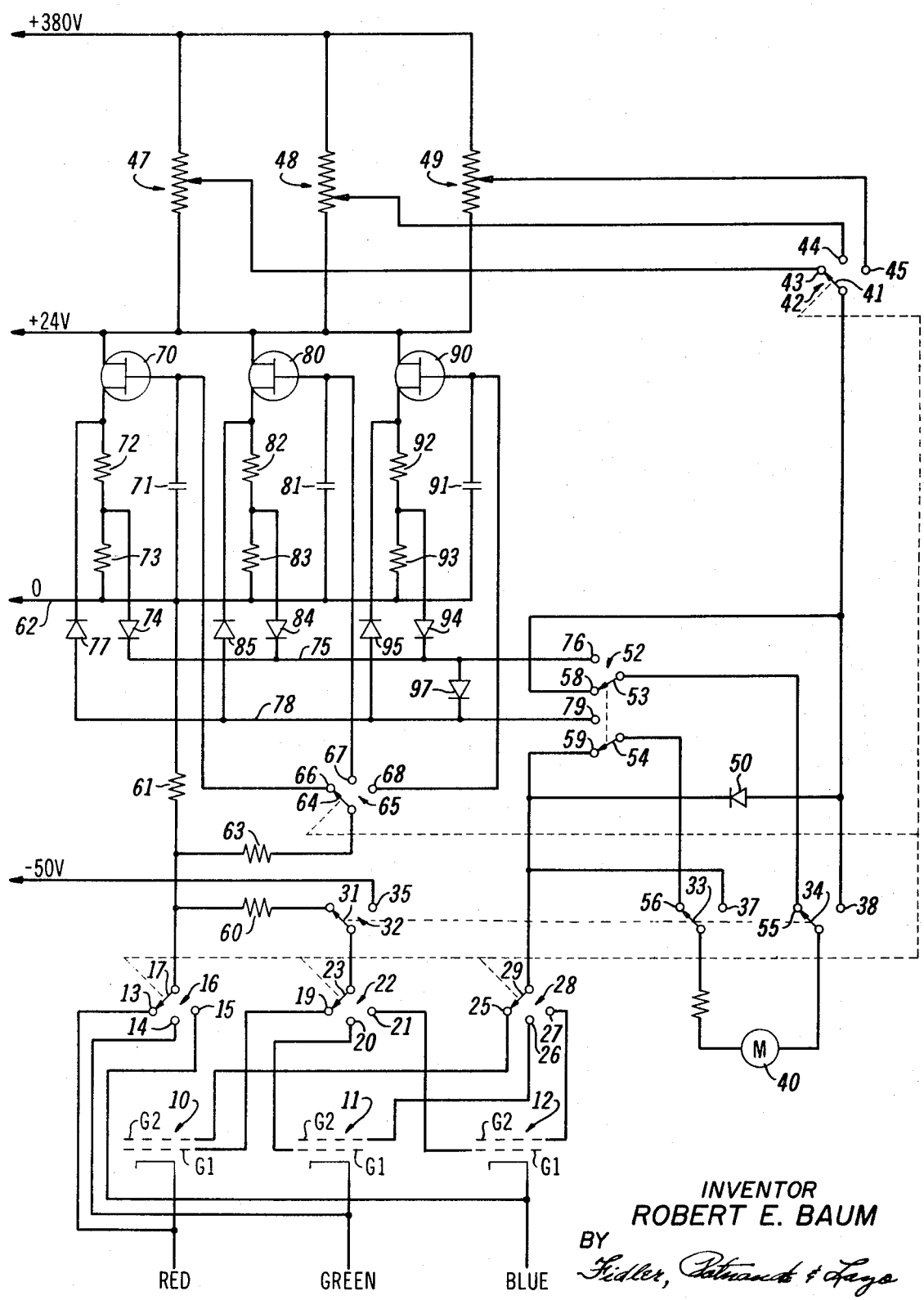

AUTOMATIC COLOR CRT TRACKING TESTER AND METHOD OF TESTING

The present invention relates to a novel method and circuit for testing the tracking characteristics of a color cathode ray tube, and it relates more particularly to a circuit for automatically checking the tracking characteristics and indicating whether such characteristics are within allowable limits.

In order to provide a satisfactory, visual display on the screen of a color cathode ray tube of the multiple gun type, it is necessary for all of the guns to have similar emission characteristics, i.e., the emission currents from the individual guns must not appreciably vary relative to one another under normal operating conditions. The emissions from the separate guns are tested by what is known as an emission check wherein the several guns are each biased close to cut-off and then the bias on all tubes is reduced by an identical amount to provide a substantial emission current from each of the guns. For proper tracking most cathode ray tube manufactures recommend that the emission current from the highest current gun be no greater than one and one-half times the emission current from the lowest current gun. Experience also shows that a greater emission current ratio results in unacceptably poor tracking and correspondingly poor picture display.

In accordance with the prior art techniques for checking tracking it was necessary to initially determine which gun had the highest emission current and which gun had the lowest emission current and then to compare the emission currents from those two guns. This was a time consuming multiple step method.

An object of the present invention is to provide a new and improved method and circuit for checking the tracking characteristics of a multiple gun color cathode ray tube.

Another object of this invention is to provide a circuit for automatically checking the tracking characteristics of a color cathode ray tube.

A further object of this invention is to provide a circuit usable with substantially all types of present-day color cathode ray tubes for determining whether the tracking characteristics thereof are within standard, acceptable limits.

Briefly, the above and further objects may be realized in accordance with the present invention by means of a circuit which stores signals proportional to the maximum emission current of each gun during the emission check, and automatically compares the values of such signals to provide an indication if the ratio of the maximum signal to the minimum signal exceeds a predetermined value.

Further objects and advantages and a better understanding of the invention may be had from the following detailed description taken in connection with the accompanying drawing, wherein:

The single FIGURE is a schematic diagram of an automatic tracking testing circuit embodying the present invention.

Referring now to the drawing, the red, green and blue electron guns of a color cathode ray tube are generally indicated at 10, 11 and 12 respectively. As shown, each of the electron guns 10, 11 and 12 includes a cathode, a control grid G1 and a screen grid G2. When testing the operation of the electron guns of a color cathode ray tube the standard practice is to apply a high negative bias on the control grids G1, to then adjust the bias on the screen grids to that value where the emission currents are minimal, and then remove the bias on the control grids and measure the emission current from each of the cathodes. If the high voltage anode of the tube is not energized during this test a meter may be connected in series with the screen grids to measure the emission current to indicate if the emission current is sufficient for a satisfactory picture display on the face of the cathode ray tube.

In order to perform the just described emission test using the circuit of the present invention, the socket of the color cathode ray tube being tested is connected to the illustrated test circuit by means of suitable plug connections not shown so that the cathodes of the three guns 10, 11 and 12 are respectively connected to switch contacts 13, 14 and 15 of a gun selector switch wafer 16 having a wiper 17 selectively engageable with the switch contacts 13, 14 and 15. The control grids G1 of the electron guns 10, 11 and 12 are respectively connected to switch contacts 19, 20 and 21 of a gun selector switch wafer 22 having a wiper 23 selectively connectible to the contacts 19, 20 and 21. Similarly, the screen grids G2 of the electron guns 10, 11 and 12 are respectively connected to switch contacts 25, 26 and 27 of a gun selector switch wafer 28 having a wiper 29 selectively connectable to the contacts 25, 26 and 27. As shown in the drawings, the wipers 17, 23 and 29 of the gun selector switch are ganged together so that in any one of the three positions the wipers 17, 23 and 29 are all connected to the elements of the same electron gun. In the illustrated position the selector switch is in the red gun selecting position and these wipers are respectively connected to the cathode, control grid G1 and screen grid G2 of the red gun 10.

The wiper 23 of the control grid selector wafer is connected to the wiper 31 of a switch wafer 32 of a function selector switch also including a wiper 33 and a wiper 34, all of the wipers 31, 33 and 34 being ganged together as illustrated. A source of 50 volts negative DC is connected to a contact element 35 which is engaged by the wiper 31 when the function selector switch is in a screen bias adjust position prior to the emission check. With the wiper 31 in contact with the switch contact 35, the wipers 33 and 34 are respectively engaging the contact elements 37 nd 38 associated therewith. It may be seen that in that position the control grids G1 are conditioned for connection to the 50 volt negative bias source through the selector switch wafer 22. At this same time an ammeter 40 connected between the wipers 33 and 34 is connected to the wiper 29 of the screen grid selector wafer 28 and to the wiper 41 of a selector switch wafer 42 which is used to couple adjustable screen grid bias voltages to the screen grids. The switch wafer 42 includes a plurality of contacts 43, 44 and 45. The wiper 41 is ganged to the other wipers 17, 23 and 29 of the gun selector switch.

The adjustable positive bias voltage for the screen grids G2 is provided by a plurality of potentiometers 47, 48 and 49 connected across output terminals of a DC power supply (not shown). As indicated on the drawing the potentiometers are connected between a first terminal having a voltage value of 380 volts and a second terminal having a voltage value of 24 volts. The wiper of the potentiometer 47 is connected to the contact element 43, the wiper of the potentiometer 48 is connected to the contact element 44, and the wiper element of the potentiometer 49 is connected to the contact element 45. It may thus be seen that the potentiometer 47 is used to adjust the bias on the screen grid G2 of the red gun, the potentiometer 48 is used to adjust the bias on the screen grid G2 of the green gun and the potentiometer 49 is used to adjust the bias on the screen grid G2 of the blue gun.

In order to perform an emission test to determine if the electron emission from each of the guns 10, 11 and 12 is satisfactory, the function switch is first placed in the screen grid adjust position wherein the wipers 31, 33 and 34 are respectively connected to the contact elements 35, 37 and 38 whereby the meter 40 is connected between the wipers 29 and 41 and the 50 volt negative bias source is connected to the wiper 23. With the gun selector switch in the illustrated position, i.e., connected to the red gun 10, the control grid G1 of the red gun is biased at 50 volts negative and the voltage from the wiper of the potentiometer 47 is connected through the switch wafer 42, a diode 50 and the switch wafer 28 to the screen grid G2 of the red gun. The diode 50 is for meter protection and becomes conductive when the needle of the meter 40 approaches full scale, thereby to keep the meter from pegging. The meter 40 is in series with the screen grid G2 of the red gun and the potentiometer 47 is now adjusted until current just begins to flow through the screen grid G2 and thus through the meter 40. The selector switch is then moved to the green control grid adjust position and the potentiometer 48 is adjusted to provide a bias on the screen grid G2 of the green gun 11 to just cause a minimal current flow therein as indicated by the meter 40. The selector switch is then placed in the blue position and the potentiometer 49 is adjusted to provide minimal current flow through the screen grid G2 of the blue gun.

After the potentiometers 47, 48 and 49 have thus been set to the so-called cut-off position for the respective guns, the program switch is moved to the illustrated emission check position thereby disconnecting the negative bias voltage from the wiper 23 of the control grid selector wafer 22. It will be noted that the meter 40 is still connected between the wiper 41 and the wiper 29 by means of a double pole switch 52 having a pair of arms 53 and 54 respectively connected to contact elements 55 and 56 of the function switch. Contact elements 58 and 59 of the switch 52 are respectively connected to the wiper 41 and to the wiper 29. The switch 52 is preferably a push button switch spring biased in the illustrated position wherein the meter 40 is connected in circuit with the screen grids, so that upon completion of the emission check the button is merely pushed to check the tracking.

With the selector switch in the illustrated position to check the red gun 10, the control grid G1 of the red gun 10 is connected to the cathode thereof by a resistor 60, the purpose of which is to protect the control grid G1 and to maintain an essentially zero bias voltage thereon relative to the associated cathode. The cathode is connected through the switch wafer 16 and through a resistor 61 to a zero reference bus 62. The cathode is also connected through a resistor 63 to the wiper 64 of a switch wafer 65 of the selector switch. Accordingly, the wiper 64 is ganged to the wipers 17, 23, 29 and 41. The wafer 65 further includes a plurality of contacts elements 66, 67 and 68.

In the red check position, the wiper 64 is connected to the contact element 66 which is in turn connected to the gate element of a field effect transistor (FET) 70. It will be apparent that the voltage developed across the resistor 61 is proportional to the electron emission from the cathode of the red gun 10 and this voltage is coupled through the resistor 63 to the gate of the FET 70. This voltage is also developed across a capacitor 71 connected between the gate of the FET 70 and the zero reference bus 62.

The FET is connected in a source follower configuration whereby the drain electrode is connected to the 24 volt bias source and the source electrode is connected to the zero reference bus 62 through a pair of serially connected resistors 72 and 73 connected in a voltage divider arrangement. The junction between the resistors 72 and 73 is connected through a diode 74 to a conductor 75 connected to a contact element 76 of the switch 52. The junction between the source electrode of the FET 70 and the resistor 72 is connected through a diode 77 to a conductor 78 connected to the contact element 79 of the switch 52. It may thus be seen that the maximum voltage developed across the resistor 61 with the selector switch in the red emission check position is stored by the capacitor 71 and, moreover, appears across the resistors 72 and 73. At the same time this voltage is developed across the resistor 61, the current through the screen grid G2 of the red gun 10 is measured and indicated by the meter 40 so that the person making the test may observe from the meter reading whether the red gun 10 has a sufficient electron emission to provide a satisfactory picture display on the face of the tube. It will be noted that the screen grid current is measured by the meter 40 and the voltage developed across the cathode resistor 61 is stored on the capacitor 71.

Having thus checked the emission of the red gun and stored a signal proportional thereto, the gun selector switch is moved to the green gun checking position. In this position the cathode of the green gun is connected through the contact element 14 and the wiper 17 to the junction between the resistors 61 and 63 whereby the voltage developed across the resistor 61 is proportional to the emission current from the green cathode. This voltage is coupled through the resistor 63 and the wiper 64 to the contact element 67 which is connected to the gate electrode of a field effect transistor (FET) 80 and developed across a capacitor 81 connected between the gate of the FET 80 and the zero reference bus 62. The drain electrode of the FET 80 is connected to the 24 volt bias source and the source electrode is connected through a pair of serially connected resistors 82 and 83 to the zero reference bus 62. The junction between the resistors 82 and 83 is connected through a diode 84 to the conductor 75 and the junction between the resistor 82 and the source electrode of the FET 80 is connected through a diode 85 to the conductor 78. Accordingly, the voltage stored on the capacitor 81 is proportional to the emission current from the green cathode whereby the voltage developed across the source resistor 82 and coupled to the conductors 75 and 78 through the diodes 84 and 85 is also proportional thereto.

With the selector switch in the green gun checking position the meter 40 indicates the current through the screen grid G2 of the green gun and the person performing the test may thus determine if such emission is sufficient to provide a satisfactory picture display on the face of the tube. Upon completion of the emission check on the green gun the gun selector switch is then moved to the blue gun checking position wherein the cathode of the blue gun 12 is connected through the contact 15 and the wiper 17 to the junction between the resistors 61 and 63, and the voltage developed across the cathode resistor 61 is proportional to the emission current of the blue gun. This voltage is coupled through the resistor 63 and the wiper 64 of the switch sector 65 to the contact element 68 connected to the gate electrode of a field effect transistor (FET) 90. This voltage is thus stored on a capacitor 91 connected between the gate electrode of the FET 90 and the zero reference bus 62. A pair of resistors 92 and 93 are serially connected between the source electrode of the FET 90 and the zero reference bus 62 and the drain electrode of the FET 90 is connected to the positive 24 volt bias source. The junction between the resistors 92 and 93 is connected through a diode 94 to the conductor 75 and the junction between the resistor 92 and the source electrode is connected through a diode 95 to the conductor 78. At this same time the control grid of the blue gun is connected to the cathode thereof by the resistor 60 so as to be essentially at zero bias and the meter 40 is connected in circuit with the green grid G2 of the blue gun so as to indicate the current therethrough.

It may thus be seen that upon completion of the emission check on each of the three electron guns of a color cathode ray tube, voltages which are respectively proportional to the maximum emission currents from each of the three guns during the emission check are stored on the capacitors 71, 81 and 91. In order to determine the tracking characteristics of the cathode ray tube using the circuit of the present invention, it is merely necessary to actuate the switch 52 to the automatic tracking checking position wherein the wipers 53 and 54 are connected respectively to the contact elements 76 and 79. If the meter 40 does not indicate that a voltage exceeding a small predetermined value exists between the conductors 75 and 78, it is known that the emission ratio between the highest current emitting gun and the lowest current emitting gun is less than a predetermined value and satisfactory tracking is provided by the tube being tested. If, on the other hand, the meter reads a value greater than the predetermined value, it is known that the tracking ratio between the guns of the tube under test exceeds that value at which a satisfactory picture display will be provided. The small predetermined voltage value may be indicated on the meter scale and is necessary to compensate for voltage drops across the diodes.

In order to provide the aforementioned current reading when the tracking ratio exceeds 1.5, the values of the resistors 72, 82 and 92; and 73, 83 and 93 are selected such that when the voltage across any of the pairs of resistors 72, 83; 82, 83 or 92, 93 is 1.5 times greater than the voltage developed across either of the other two pairs of resistors, a voltage sufficient to actuate the meter 40 is provided between the conductors 75 and 78. In a reduction to practice of the present invention the resistors 72, 82 and 92 each had a value of 2.7 kilohms and the resistors 73, 83 and 93 each had a value of 6 kilohms.

To understand the operation of this automatic tracking checking circuit let it be assumed that the voltage stored across the capacitor 71 during the emission check of the red gun has a value of E. Accordingly, this value of E volts appears at the source electrode of the FET 70. Let it be assumed that the tracking characteristics of the tube under test are unsatisfactory and that the green gun has an emission current such that the voltage stored on the capacitor 81 is 1.5 E volts. This same value of 1.5 E volts thus appears on the source electrode of the FET 80. Since the diodes 77, 85 and 95 are polarized to conduct current to the source electrodes of the FETs 70, 80 and 90 the voltage developed on the conductor 78 on the negative terminal of a meter protection diode 97 connected between the conductors 75 and 78 will be the minimum voltage appearing on any of the source electrodes of the FETs 70, 80 and 90. As we have assumed, the emission current from the red gun is the lowest and therefore the voltage of E volts appears on the conductor 78. The voltage appearing between the resistors 82 and 83 is equal to 6/8.7×1.5 E volts or 1.03 E volts. Accordingly, a voltage of 0.03 E volts appears between the conductors 75 and 78 which, when the switch 52 is positioned in the automatic tracking selection position, is coupled across the terminals of the meter 40 which will read up scale an amount exceeding the predetermined value. The value is preferably marked on the scale of the meter so that when the meter reads an amount equal to or greater than such value the tracking is excessive.

It may thus be seen that with the circuit of the present invention voltages are stored on the capacitors 71, 81 and 91 proportional to the emission currents thereof during the check of the emission characteristics of each of the guns of a multiple gun color cathode ray tube, and a voltage equal to that developed by the lowest emitting gun is coupled to the conductor 78 and a voltage equal to the 66.67 times the voltage proportional to the emission from the highest emitting gun is coupled to the conductor 75. If the voltage on the conductor 75 exceeds that on the conductor 78, when the switch 52 is moved into the tracking check position the meter 40 will read up scale an amount indicating that one of the guns has an emission current which is at least 1.5 times greater than the emission current of one of the other guns. The time consuming tracking test of the prior art is thus obviated.

Although the present invention is not limited to the use of any particular circuit parameters, it has been found that the following parameters provide a satisfactory circuit for indicating when the tracking exceeds 1.5:

| | |
|---|---|
| Resistors 72, 82, 92 | 2.0 Kohms (2%) |
| Resistors 73, 83, 93 | 6.7 Kohms (1%) |
| Resistor 61 | 6.8 Kohms (5%) |
| Resistor 63 | 100 Kohms |
| Capacitors 71, 81, 91 | .22 µf |
| FETs 70, 80, 90 | 2N5457 |
| Diodes 74, 77, 84, 85, 94, 95 | IN34 |
| Diodes 50, 97 | IN4148 |

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A method of testing the emission and tracking characteristics of a multiple gun cathode ray tube, comprising the steps of sequentially measuring the emission current from each gun of said tube under predetermined operating conditions and simultaneously storing a voltage proportional to said current, and then comparing the stored voltages from said guns and indicating if the ratio of the highest to the lowest of said voltages exceeds a predetermined value.

2. A method according to claim 1 wherein said emission currents are measured by a meter connected in series with the screen grids of said guns, and said voltages are derived from resistance means connected in the cathode circuits of said tube.

3. An automatic tracking tester for a color cathode ray tube having a plurality of electron guns each including a control grid, a screen grid and a cathode, comprising a plurality of voltage dividers, means for passing through said dividers currents proportional to the respective cathode emission currents from each of said guns, said dividers each having a first voltage output proportional to the current passed therethrough and a second voltage output equal to a predetermined percentage thereof, an ammeter, and a plurality of unidirectional impedance means connected between said first and second outputs and said ammeter for coupling the lowest of the voltages appearing at said first outputs to one terminal of said ammeter and the highest of the voltages appearing at said second outputs to the other terminal of said ammeter.

4. An automatic tracking tester according to claim 3, comprising means for selectively energizing said electron guns, means for developing voltages proportional to the cathode emission currents from said guns, and a plurality of storage devices for storing said voltages developed by said last named means.

5. An automatic tracking tester according to claim 4 comprising gun selector switch means for selectively connecting a positive voltage to the screen grids of said guns and selectively connecting said storage devices to the corresponding gun.

6. An automatic tracking tester according to claim 4 comprising switch means having a first switching position for connecting a negative bias voltage to the control grids of said guns and a second switching position disconnecting said bias voltage from said control grids.

7. An automatic tracking tester according to claim 6 comprising switch means for selectively connecting said unidirectional impedance devices to said ammeter only when said negative bias voltage is disconnected from said control grids.

8. An automatic tracking tester according to claim 4 comprising a plurality of field effect transistors, said voltage dividers are connected to the source electrodes of said transistors, and said storage devices are capacitors connected to the gate electrodes of said transistors.

9. An automatic tracking tester according to claim 8 wherein said means for developing voltages comprises resistance means selectively connectible in series with the cathodes of said guns.

* * * * *